United States Patent [19]

Morgan

[11] Patent Number: 4,790,222
[45] Date of Patent: Dec. 13, 1988

[54] APPARATUS FOR CUTTING VARIOUS FORMS OUT OF A PICTURE FRAME MAT OR THE LIKE

[76] Inventor: Carey C. Morgan, 440 Hwy. 51 North, Madison, Miss. 39110

[21] Appl. No.: 114,663

[22] Filed: Oct. 29, 1987

[51] Int. Cl.⁴ .................. B23B 41/04; B76D 3/10
[52] U.S. Cl. .................... 82/1.3; 33/18.1; 33/30.7; 82/18; 83/464; 83/523; 83/646
[58] Field of Search ............ 83/646, 647.5, 523, 83/591, 879, 880, 464; 33/18.1, 23.11, 27.01, 27.02, 27.03, 27.04, 27.06, 27.09, 27.10, 30.1, 30.7; 82/1.3, 18

[56] References Cited

U.S. PATENT DOCUMENTS

| | | | |
|---|---|---|---|
| 3,435,716 | 4/1969 | Sjostrand | 83/564 |
| 3,845,676 | 11/1974 | Pierce | 82/1.3 |
| 4,112,793 | 9/1978 | Pierce | 82/1.3 |
| 4,662,073 | 5/1987 | Prusman | 33/27.01 |

Primary Examiner—Frank T. Yost
Assistant Examiner—Hien H. Phan
Attorney, Agent, or Firm—Dewitt L. Fortenberry, Jr.

[57] ABSTRACT

A device for cutting oval or circle shaped forms, as well as irregular or scalloped variations thereof, in picture frame mats or the like. It consists of a cutting unit releasably securable both to a stationary arm or a reciprocating arm. When the cutting mount is secured only to the stationary arm, as the stationary arm rotates, the cutting unit mount turns and a circle or oval form is cut. If the cutting unit mount is only secured to the reciprocating arm, a chain and sprocket or gear arrangement causes the reciprocating arm and cutting unit to move in and out as the oval or circle shaped form is cut. A mechanism for adjusting the desired irregular or scalloped shape is also provided.

19 Claims, 8 Drawing Sheets

APPARATUS FOR CUTTING VARIOUS FORMS OUT OF A PICTURE FRAME MAT OR THE LIKE

SUMMARY OF THE INVENTION

This invention relates to an apparatus for cutting circle or oval shaped forms, as well as irregular or scalloped variations thereof, out of picture frame mats or the like. Such devices are typically used in the picture framing industry to cut picture frame mats used to frame drawings and pictures.

Devices capable of cutting oval or circle shaped forms in picture mats have been available in the picture framing industry for years. Some of the earliest devices for cutting such forms are described in U.S. Pat. No. 673,483 (Shawver); U.S. Pat. No. 683,809 (Starr); and U.S. Pat. No. 697,997 (Drinkaus). Over the years, numerous other inventors have received patents for oval and circular mat cutters of various designs. One very popular device used today is the Oval Master manufactured by C&H Manufacturing Co., located in Jackson, Miss. The invention described herein basically consists of an attachment adaptable to be used with the Oval Master or other similar mat cutting device.

The invention is designed so that when a crank arm is turned in a clockwise or counterclockwise direction, a gear arrangement turns a crank assembly on the end of the crank arm thereby causing a reciprocating arm to move in and out. If a cutting unit is not secured to the reciprocating arm, a circle or oval shaped form will be cut. If the cutting unit is secured to the reciprocating arm, irregular or scalloped variations of the oval or circle shaped forms will be cut.

It is, therefore, an object of this invention to provide an apparatus for cutting oval or circle shaped forms in picture frame mats or the like.

Another object of this invention is to provide an apparatus for cutting irregular or scalloped variations of oval or circle shaped forms in picture frame mats or the like.

An object of this invention is to also provide an apparatus easily adaptable to most any device designed to cut oval or circle shaped forms out of picture frame mats or the like.

Yet another object of this invention is to provide an apparatus which is compact and easy to manufacture as well as being relatively inexpensive.

These and other objects of this invention will become readily apparent upon examination of the attached drawings and Detailed Description of the Preferred Embodiment.

DESCRIPTION OF THE PREFERRED EMBODIMENT

Figure 2:
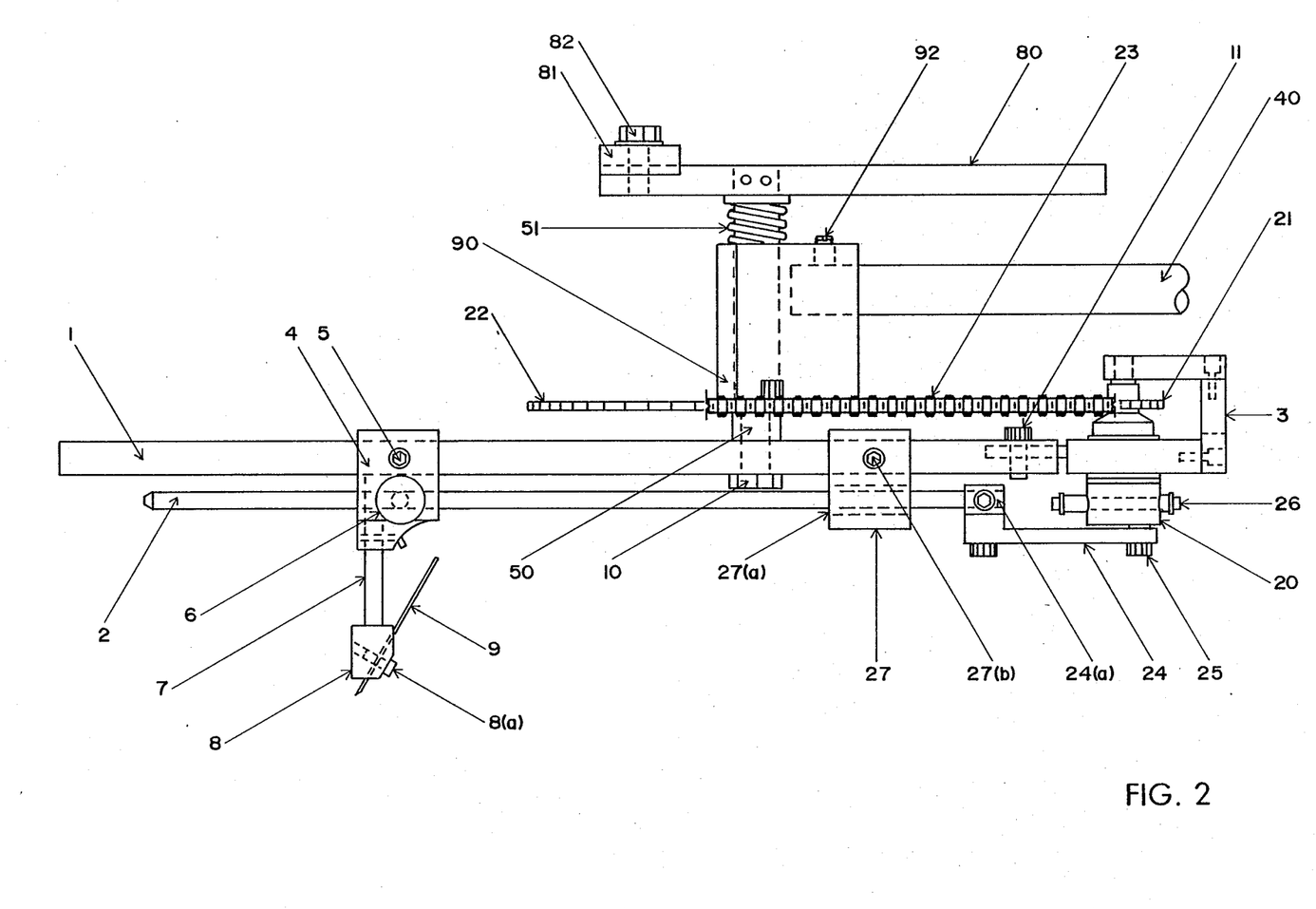
FIG. 2 is a side view of the apparatus.
Figure 3:
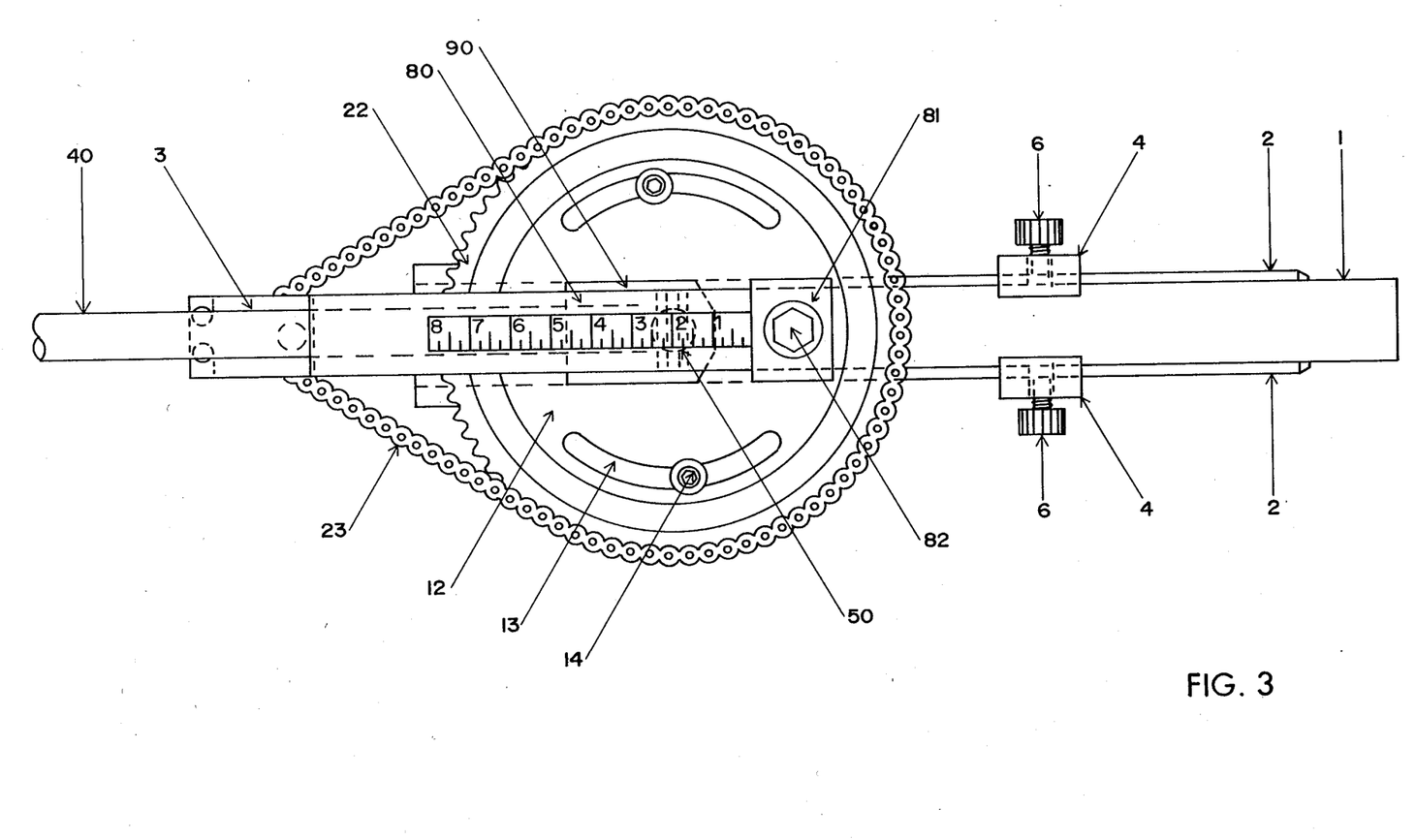
FIG. 3 is a top view of the apparatus.
Figure 4:
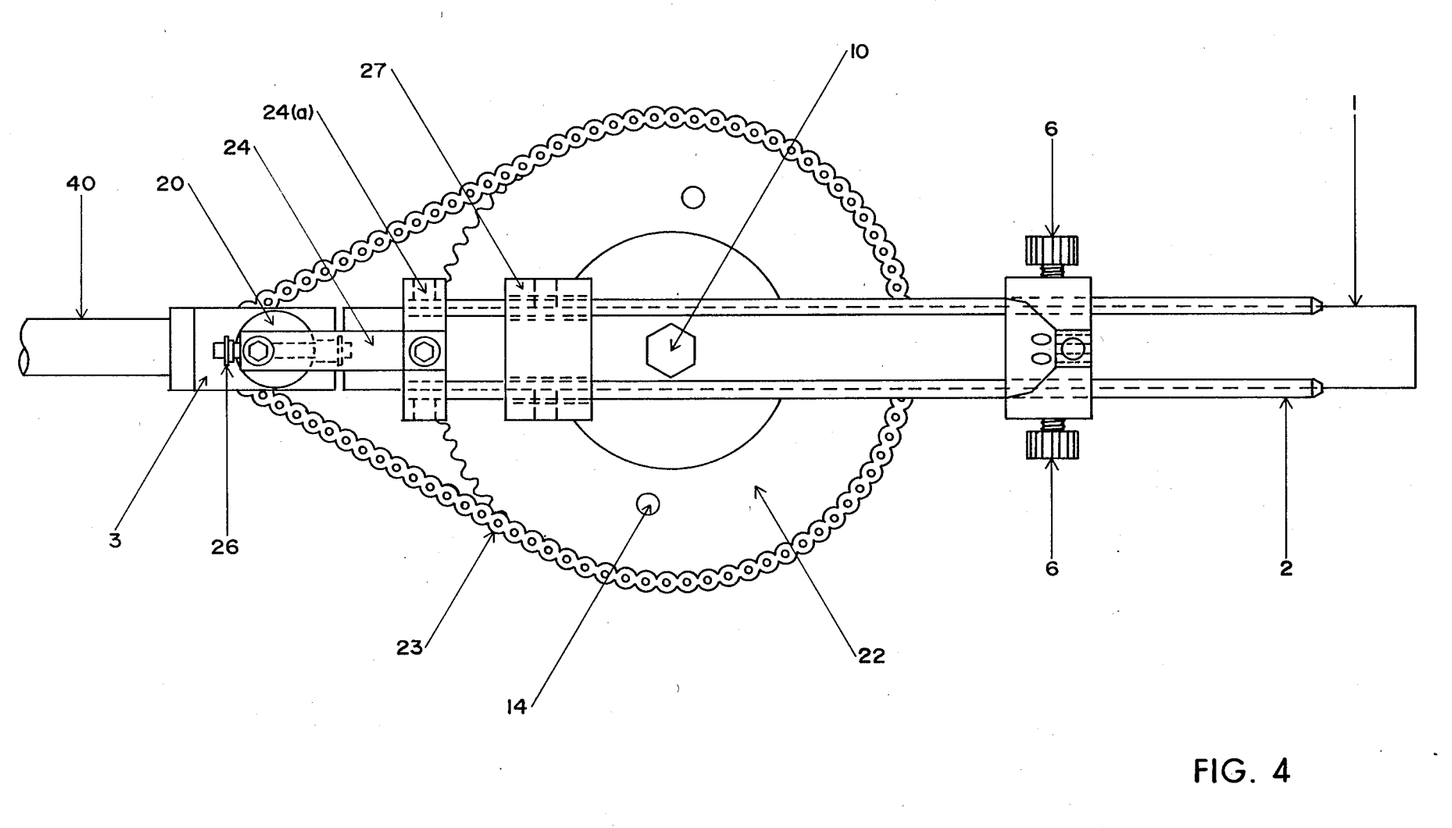
FIG. 4 is a bottom view of the apparatus.

Referring first to FIGS. 2 through 4 the basic components of the apparatus are a ruler arm assembly 80, a vertical support shaft 50, a bearing shaft block 90, a horizontal support bar referred to as a Y-shaft 40, a drive mechanism consisting of a first sprocket 22 and a second sprocket 21 interconnected by a chain 23, a bearing and housing unit 3, a crank mechanism 20, a connecting rod 24, a reciprocating rod 2, a tool holder bar 1 and a cutting unit mount 4.

Describing the invention in more detail, the ruler arm assembly 80 has a zero stop plate 81 secured to the outermost top side of said ruler arm assembly 80 by a lock screw 82. Connected to and extending from the bottom side of said ruler arm assembly 80 is the vertical support shaft 50. A spring 51 is positioned around said vertical support shaft 50 so as to separate the ruler arm assembly 80 from the bearing shaft bock 90. The spring 51 also repositions the ruler arm assembly 80 after cutting a mat. As can be seen in FIG. 2, the bearing shaft block 90 has a passageway therethrough for acceptance of the vertical support shaft 50. The bearing shaft block 90 is also secured to the Y-shaft 40 by a lock screw 92. The vertical support shaft 50 extends through the bearing shaft block 90 that is secured to a plate 12 which is releasibly secured to the first sprocket 22 by bolt 14. The vertical support shaft 5 also extends through said plate 12 and first sprocket 22 and is attached to the tool holder bar 1 by a screw 10. Connected to the first sprocket 22 is the chain 23 which is also connected to the second sprocket 21 mounted on a crank mechanism 20. It should be noted that the drive mechanism consisting of the first sprocket 22, the second sprocket 21, and chain 23 can be replaced by a gear mechanism without altering the operation or scope of the invention. The crank mechanism 20 is supported by a bearing and housing unit 3 which is secured to the tool holder bar 1 by a screw 11. A connecting rod 24 is releasibly secured to the base of the crank mechanism 20 by a shoulder bolt 25 which is threaded to a sliding rod 26 which is slidably supported by said crank mechanism 20. The sliding rod 26 is horizontally adjustable so as to provide a means for altering the distance of the shoulder bolt 25 from the central vertical axis of the crank mechanism 20. The connecting rod 24 is also secured to the reciprocating rod 2 by a T-bar 24(a).

A bearing block 27 is secured to the tool holder bar 1 by a screw 27(b). The bearing block 27 has a passageway 27(a) therethrough for acceptance of the reciprocating rod 2. The bearing block 27 therefore stabilizes the end of the reciprocating rod 2 so that its movement is only in and out (right to left as viewing FIG. 2).

Figure 1:
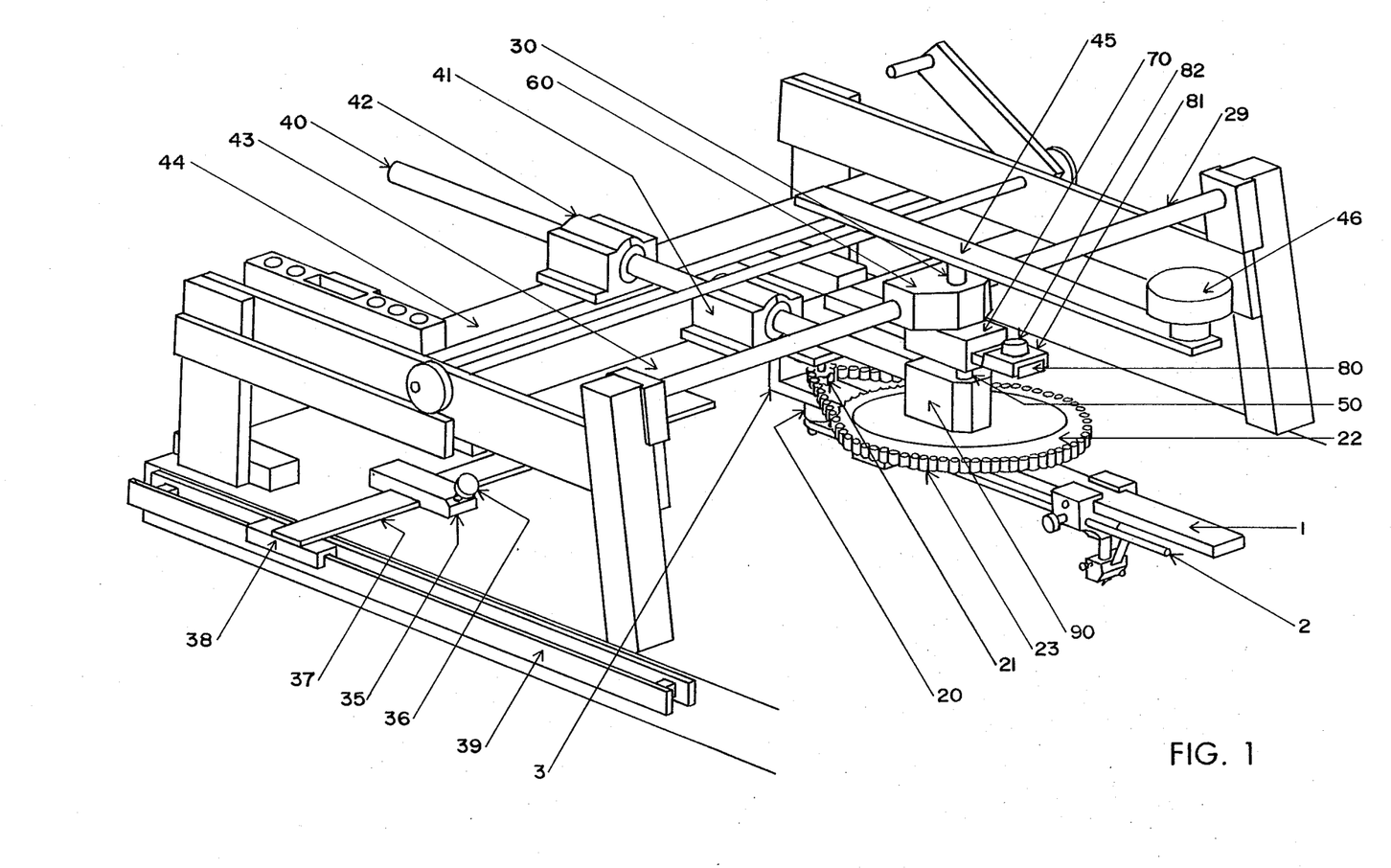
FIG. 1 is a view of the relationship of the apparatus described herein attached to an Oval Master picture frame mat cutting device.

Referring to FIG. 1, it can be seen that the apparatus is inserted in an Oval Master, or other similar device, by inserting the Y-shaft 40 through bearing house 41 and 42 which are supported by frame members 43 and 44. As Y-shaft 40 is inserted, the ruler arm assembly 80 is also inserted through a zero adjustment block assembly 70.

With respect to the other parts of the Oval Master necessary to explain the operation of the invention, a horizontal shaft identified as an X-shaft 29 supports a bearing housing 60. The bearing housing 60 is designed to support a vertical shaft identified as a Z-shaft 30. The Z-shaft 30 is allowed to rotate within the bearing housing 60 and said Z-shaft 30 also extends through said bearing housing 60 and is secured to the zero adjustment block assembly 70. The Z-shaft 30 also extends outwardly above the bearing housing 60 and is secured to a handle 45 having a knob 46. It can therefore be seen that as the knob 46 is used to turn the handle 45 in either a clockwise or counterclockwise direction, the Z-shaft 30 will rotate in the same direction thereby turning the zero block assembly 70 and powering the invention.

The turning of the ruler arm assembly 80 rotates the vertical support shaft 50 which operates through the first sprocket 22 and also turns the tool holder bar 1 in the same direction that the handle 45 is being turned. As the tool holder bar 1 turns, the second sprocket 21 orbits around the stationary first sprocket 22. Said first sprocket 22 and said second sprocket 21 are connected by chain 23 which gives revolving power to said second sprocket 21 and also causes the end of the connecting rod 24 and shoulder bolt 25 to pivot around the center vertical axis of said crank mechanism 20. This pivoting movement also causes the connecting rod 24 and the T-bar 24(a) to move in and out thereby moving the reciprocating rod 2 in and out. Since the bearing block 27 is secured to the tool holder bar 1, the reciprocating movement of the reciprocating rod 2 is stabilized.

Prior to cutting a desired form out of a picture frame mat or the like, the mat or object to be cut is placed on a table top 99. The mat is then squared by using a sliding bar 37 having a perpendicular square 35. The sliding bar 37 can be positioned at the desired location by sliding a shuttle member 38 along a rail 39. When the object to be cut is properly squared, its position is maintained by tightening the screw 36.

Figure 8:
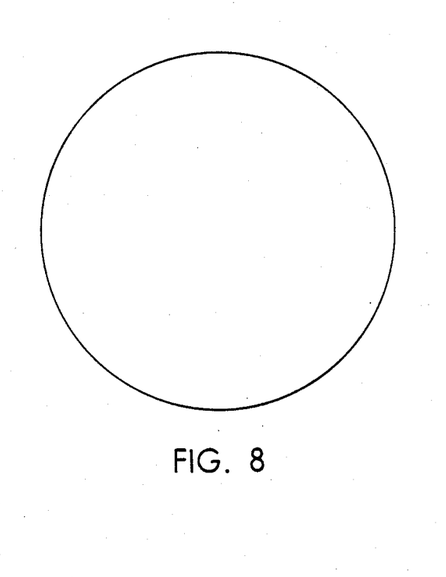
Figure 9:
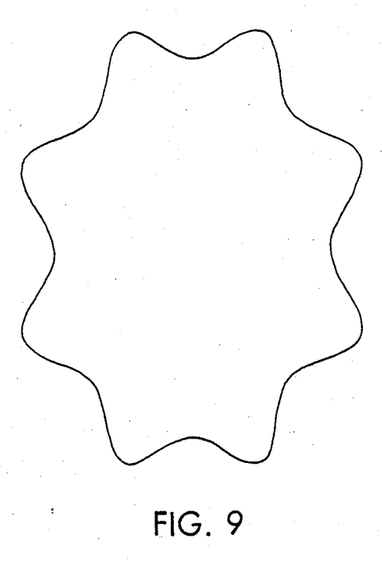
Figure 10:
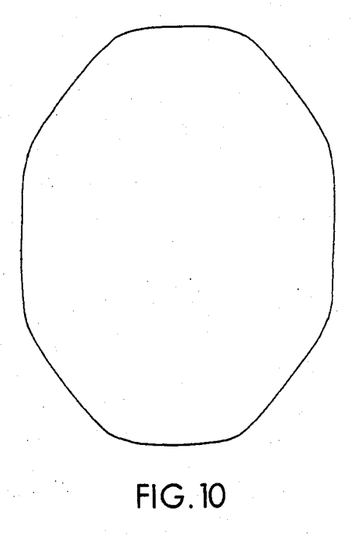
Figure 11:
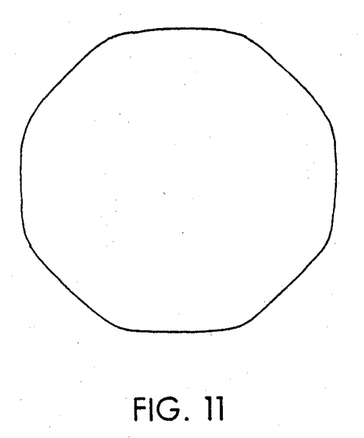
Figure 12:
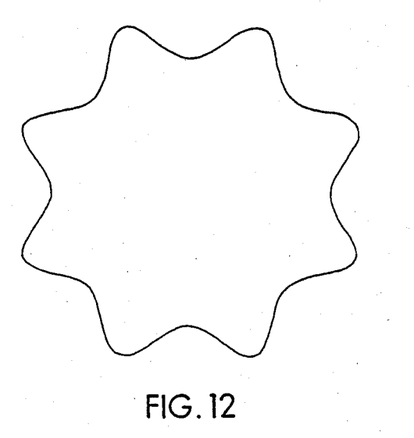
Figure 13:
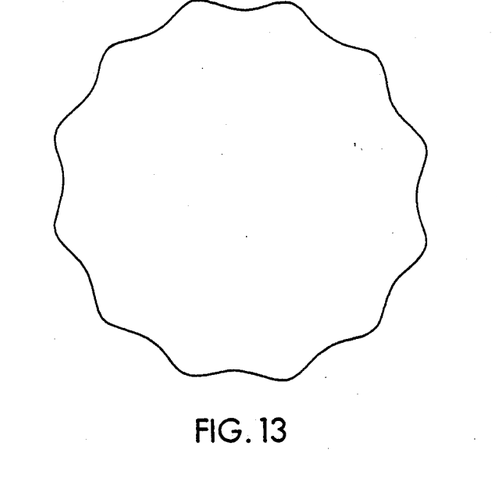
Figure 14:
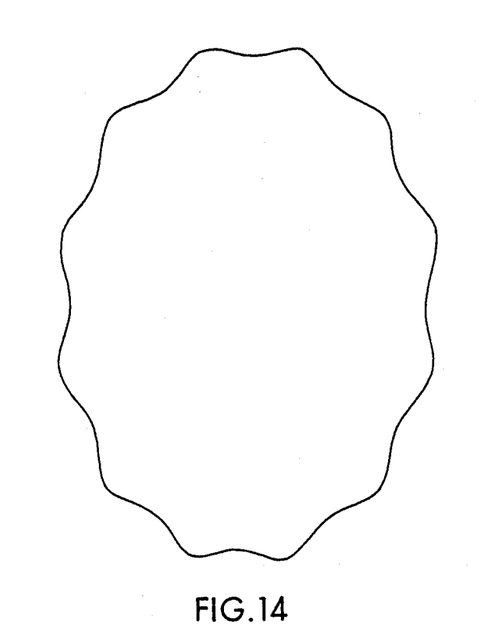
Figure 15:
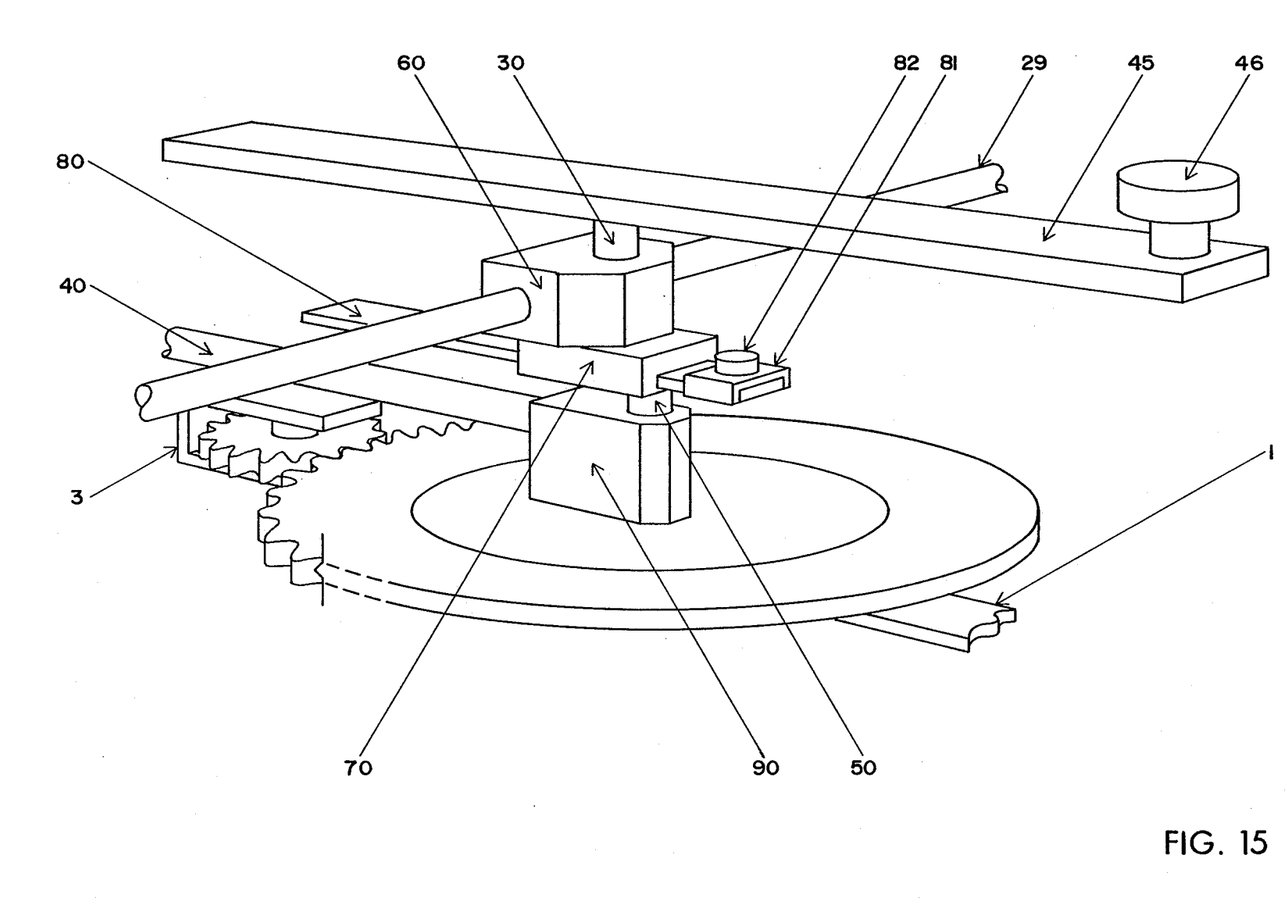
FIG. 15 is a view of a drive mechanism according to another preferred embodiment.

Once the picture mat is in place and if it is desired to cut a circular form as shown in FIG. 8, the ruler arm assembly 80 is inserted toward the zero adjustment block assembly 70 until the T-cap 81 comes in contact with said zero adjustment block assembly 70. The desired diameter of the circle is then adjusted by sliding the cutting unit mount 4 in or out. The cutting unit mount 4 consists of an extension arm 7, a blade mount 8 having blade 9 secured thereto by an adjustment screw 8(a).

When the cutting unit mount 4 is positioned to cut the desired diameter, a lock screw 5 is tightened and a screw 6 is untightened. The cutting unit mount 4 is then secured to the tool holder bar 1 but not to the reciprocating rod 2 so that said reciprocating rod 2 moves back and forth through a passageway in the cutting unit mount 4. By turning the handle 45, the tool holder bar 1 is rotated in the same direction as the handle 45 causing the blade 9 to move in the same direction thereby cutting the desired circle. As the circle shaped form is being cut, it should be noted that as the handle 45 is turned, the first sprocket 22 remains stationary and does not turn because it is mounted to the underside of the bearing shaft block 90. Since the second sprocket 21 is mounted on the aft end of the tool holder bar 1, said sprocket orbits arounds the first sprocket 22 for each complete orbit of the handle 45. Since the first sprocket 22 and the second sprocket 21 are connected by the chain 23, the second sprocket 21 is caused to rotate, and the crank mechanism 20 turns causing the connecting rod 24 and reciprocating rod 2 to move in and out. Since the cutting unit mount 4 is not secured to the reciprocating rod 2, the cutting unit mount 4 is not affected by the movement of said reciprocating rod 2.

When it is desired to cut an irregular or scalloped shaped circle as shown in FIGS. 7, 11, 12, and 13, all that is necessary is to loosen the lock screw 5 and tighten the screw 6. This will result in the cutting unit mount 4 reciprocating in and out with the reciprocating rod 2 as the handle 45 is turned.

Figure 5:
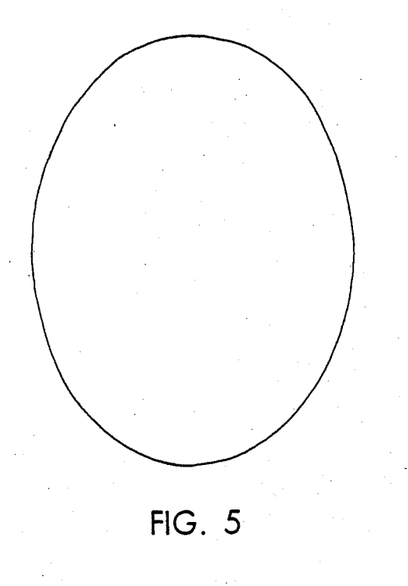
FIG. 5-14 are representations of various shaped forms which can be cut by the apparatus.
Figure 6:
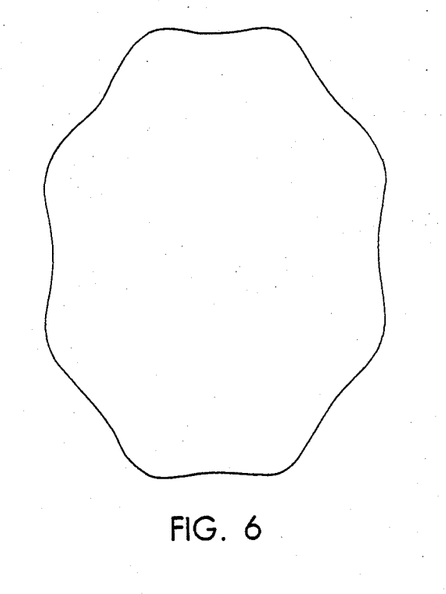
Figure 7:
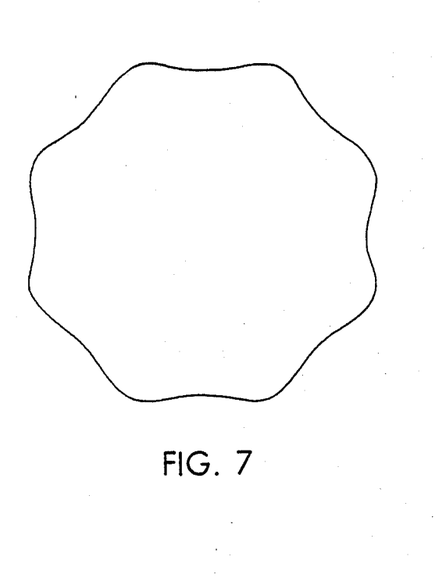

To cut an oval form as indicated in FIG. 5, the T-cap 81 connected to the ruler arm assembly 80 is pulled away from the zero adjustment block assembly 70. This results in the center vertical axis of the Z-shaft 30 not being in the same vertical plane as the center axis of the vertical support shaft 50. The path followed by the tool holder bar 1 and the cutting unit mount 4 is therefore oval in shape. To cut irregular or scalloped oval forms as shown in FIGS. 6, 9, 10, and 14, the lock screw 5 is simply loosened and the screw 6 tightened.

When it is desired to change the degree of the reciprocating action of the sliding rod 2 so as to alter the irregular shape of the form being cut, the distance of movement of the T-bar 24(a) is adjusted by repositioning the shoulder bolt 25 with respect to the central vertical axis of the crank mechanism 20. Since the shoulder bolt 25 is threaded to the sliding rod 26, the sliding of said sliding rod 26 to different locations alters the reciprocating movement of the connecting rod 24 and the reciprocating rod 2. The closer the shoulder bolt 25 is to the central vertical axis of the crank mechanism 20, the less the movement of the connecting rod 2 and the smaller the reciprocating action of said reciprocating arm 2. The further the shoulder bolt 25 is positioned from the central vertical turning axis of the crank mechanism 20, the greater the resulting movement of the reciprocating arm 2.

Although particular components have been discussed with respect to the specific embodiment of the invention, other components may be utilized in accordance with the teachings of the present invention. Furthermore, it is understood that although an exemplary embodiment of the invention has been disclosed, other applications and mechanical arrangements are possible and the embodiment disclosed may be subject to various changes, modifications, and substitutes without departing from the spirit of the invention.

What is claimed is:

1. An apparatus for cutting picture frame mats or the like comprising:
    a ruler arm assembly connected to a vertical support shaft;
    a Y-shaft attached to a bearing shaft block having a passageway therethrough for acceptance of said vertical support shaft;
    a drive mechanism attached to said vertical support shaft;
    a tool holder bar secured to said vertical support shaft, said tool holder bar having a housing unit supporting a crank mechanism rotatably attached to said drive mechanism;
    a sliding rod extending through said crank mechanism; a reciprocating rod movably secured to said sliding rod; and
    a cutting unit releasibly securable to both said tool holder bar and said reciprocating rod.

2. The apparatus of claim 1 wherein a housing is secured to said tool holder bar, said housing having a passageway therethrough for acceptance of said reciprocating rod.

3. The apparatus of claim 1 wherein said reciprocating rod is secured to a connecting rod connected to said adjustable sliding rod.

4. The apparatus of claim 1 wherein said ruler arm assembly has a T-cap secured thereto.

5. The apparatus of claim 1 wherein said ruler arm assembly is separated from said bearing shaft block by a spring.

6. The apparatus of claim 1 wherein said drive mechanism consists of a first sprocket, a second sprocket, and a chain interconnecting said first sprocket and said second sprocket.

7. The apparatus of claim 6 wherein a housing is secured to said tool holder bar, said housing having a passageway therethrough for acceptance of said reciprocating rod.

8. The apparatus of claim 6 wherein said reciprocating arm is secured to a connecting rod pivotally connected to said sliding rod.

9. The apparatus of claim 6 wherein said ruler arm assembly has a T-cap secured thereto.

10. The apparatus of claim 6 wherein said ruler arm assembly is separated from said bearing shaft block by a spring.

11. The apparatus of claim 1 wherein said drive mechanism consists of a first gear and a second gear being interconnected.

12. The apparatus of claim 11 wherein a housing is secured to said tool holder bar, said housing having a passageway therethrough for acceptance of said reciprocating arm.

13. The apparatus of claim 11 wherein said reciprocating arm is secured to a connecting rod pivotally connected to said adjustable sliding rod.

14. The apparatus of claim 11 wherein said ruler arm assembly has a T-cap secured thereto.

15. The apparatus of claim 11 wherein said ruler arm assembly is separated from said bearing shaft block by a spring.

16. An apparatus for cutting picture frame mats or the like comprising:
- a ruler arm assembly connected to a vertical support shaft;
- a Y-shaft attached to a bearing shaft block having a passageway therethrough for acceptance of said vertical support shaft;
- a drive mechanism attached to said vertical support shaft;
- a tool holder bar secured to said vertical support shaft, said tool holder bar having a housing unit supporting a crank mechanism rotatably attached to said drive mechanism;
- a sliding rod extending through said crank mechanism;
- a reciprocating rod secured to a connecting rod connected to said sliding rod;
- a housing secured to said tool holder bar, said housing having a passageway therethrough for acceptance of said reciprocating rod; and
- a cutting unit releasibly securable to both said tool holder bar and said reciprocating rod.

17. An apparatus for cutting picture frame mats or the like comprising:
- a ruler arm assembly connected to a vertical support shaft and said ruler arm assembly having T-cap secured thereto;
- a Y-shaft attached to a bearing shaft block having a passageway therethrough for acceptance of said vertical support shaft;
- a spring for separating said ruler arm assembly from said bearing block;
- a drive mechanism attached to said vertical support shaft;
- a tool holder bar secured to said vertical support shaft, said tool holder bar having a housing unit supporting a crank mechanism rotatably attached to said drive mechanism;
- a sliding rod extending through said crank mechanism;
- a reciprocating rod secured to a connecting rod connected to said sliding rod;
- a housing secured to said tool holder bar, said housing having a passageway therethrough for acceptance of said reciprocating rod; and
- a cutting unit releasibly securable to both said tool holder bar and said reciprocating rod.

18. An apparatus for cutting picture frame mats or the like comprising:
- a ruler arm assembly connected to a vertical support shaft;
- a Y-shaft attached to a bearing shaft block having a passageway therethrough for acceptance of said vertical support shaft;
- a drive mechanism attached to said vertical support shaft said drive mechanism consisting of a first sprocket, a second sprocket, and a chain interconnecting said first sprocket and said second sprocket;
- a tool holder bar secured to said vertical support bar, said tool holder bar having a housing unit supporting a crank mechanism rotatably attached to said drive mechanism;
- a sliding rod extending through said crank mechanism;
- a reciprocating rod secured to a connecting rod connected to said sliding rod;
- a housing secured to said tool holder bar, said housing having a passageway therethrough for acceptance of said reciprocating rod; and
- a cutting unit releasibly securable to both said tool holder bar and said reciprocating rod.

19. An apparatus for cutting picture frame mats or the like comprising:
- a ruler arm assembly connected to a vertical support shaft;
- a Y-shaft attached to a bearing shaft block having a passageway therethrough for acceptance of said vertical support shaft;
- a drive mechanism attached to said vertical support shaft said drive mechanism consisting of a first gear and a second gear being interconnected;
- a tool holder bar secured to said vertical support bar, said tool holder bar having a housing unit supporting a crank mechanism rotatably attached to said drive mechanism;
- a sliding rod extending through said crank mechanism;
- a reciprocating rod secured to a connecting rod connected to said sliding rod;
- a housing secured to said tool holder bar, said housing having a passageway therethrough for acceptance of said reciprocating rod; and
- a cutting unit releasibly securable to both said tool holder bar and said reciprocating rod.

* * * * *